Jan. 4, 1955    W. E. BRILL    2,698,609
TUNNEL CRANKCASE AND CRANKSHAFT MOUNTING THEREIN
Filed Dec. 20, 1951    2 Sheets-Sheet 1
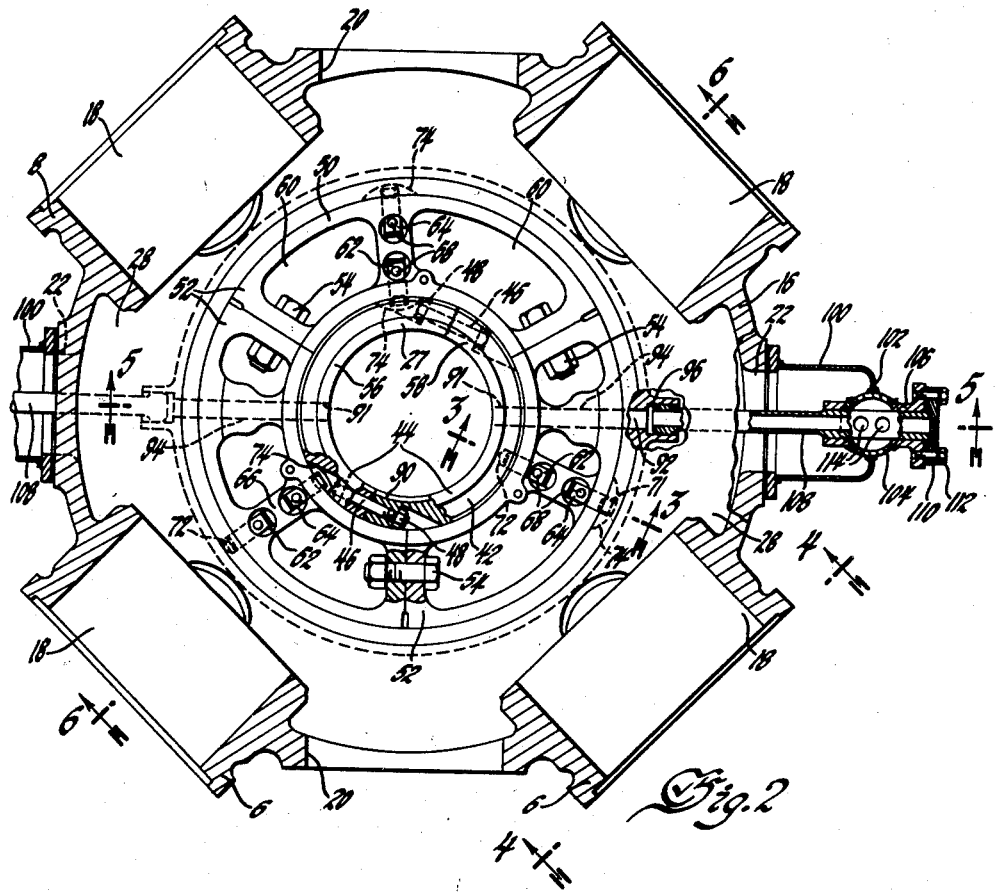
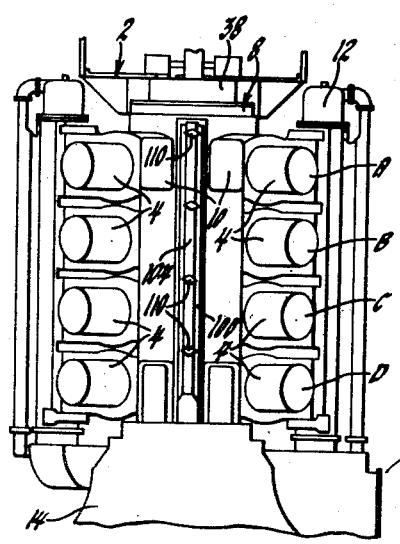
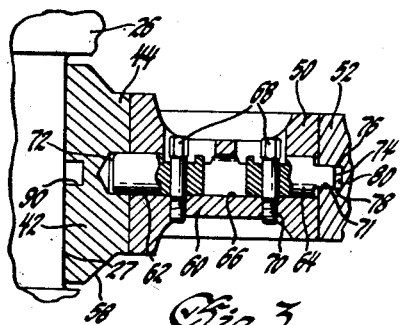
INVENTOR.
William E. Brill
BY
Willits, Helwig & Caillio
ATTORNEYS Jan. 4, 1955  W. E. BRILL  2,698,609
TUNNEL CRANKCASE AND CRANKSHAFT MOUNTING THEREIN
Filed Dec. 20, 1951  2 Sheets-Sheet 2

INVENTOR.
William E. Brill
BY
Willits, Helmig & Bailie
ATTORNEYS

United States Patent Office 2,698,609
Patented Jan. 4, 1955

2,698,609

TUNNEL CRANKCASE AND CRANKSHAFT MOUNTING THEREIN

William E. Brill, Cleveland, Ohio, assignor to General Motors Corporation, Detroit, Mich., a corporation of Delaware Application December 20, 1951, Serial No. 262,537

9 Claims. (Cl. 121—194)

This invention relates to internal combustion engines and particularly to such engines of the multi-row, radial, vertical crankshaft type.

Among the principal improvements and advantages in such engines afforded by this invention are a tunnel crankcase having its outer wall formed with hollow webs extending inwardly and annularly thereof, which webs serve both as structural members in reinforcing the crankcase and in radially positioning the crankshaft journa.ling means, and as collecting chambers to receive the drain oil from the section of the crankcase upwardly adjacent thereto; a crankshaft journalling means in the form of segmental annular bearings and bearing carriers which cooperate with said webs to transversely partition the crankcase into substantially fluid-tight vertically adjacent compartments or sections, whereby the engine lubricating oil in each compartment or section is prevented from gravitating into and interfering with the operation of the crankshaft and its associated reciprocating pistons and connecting rods in the crankcase section or sections below; and means for locating said bearings with the desired restraint against movement longitudinally and rotationally with the crankshaft, in the form of radially retractible dowels spaced circumferentially about the inner and outer margins of the carriers for engagement with recesses provided in the opposing annular faces of the webs and bearings, only one of which recesses in both the web and the bearing and the respective dowel ends receivable therein are of a configuration requiring close angular alignment of the crankcase, carrier and bearing about the longitudinal axis of the crankshaft, thereby both facilitating the insertion and removal of the bearings and carriers during engine assembly and obviating the need for close dimensional tolerances in the circumferential spacing of the dowels or their recesses.

These and other features and advantages of the engine will now be described in detail, having reference to the drawings wherein:

Figure 1 is a general side elevational view of an engine embodying the invention.

Figure 2 is an enlarged transverse sectional view of the engine of Figure 1, taken substantially through the lowermost row of cylinders (line 2—2 of Figure 4), with certain parts such as the engine cylinders and their fuel and air manifolds removed for reasons of clarity.

Figure 3 is an enlarged sectional view taken substantially on line 3—3 of Figure 2.

Figure 5:
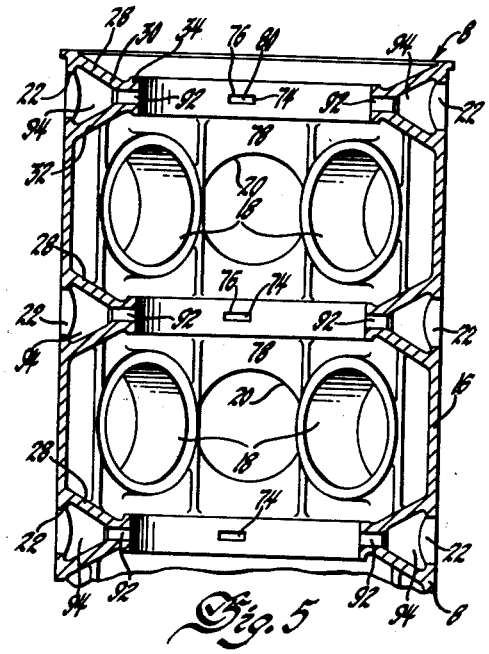
Figure 6:
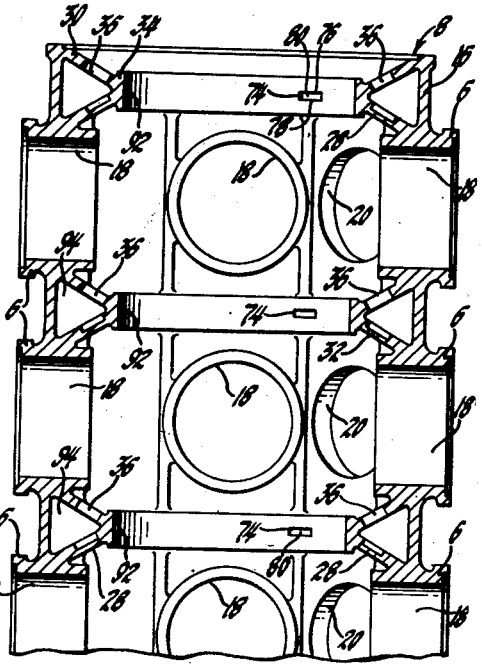

Figures 5 and 6 are sectional views of the crankcase taken substantially on lines 5—5 and 6—6 respectively of Figure 2.

Figure 4:
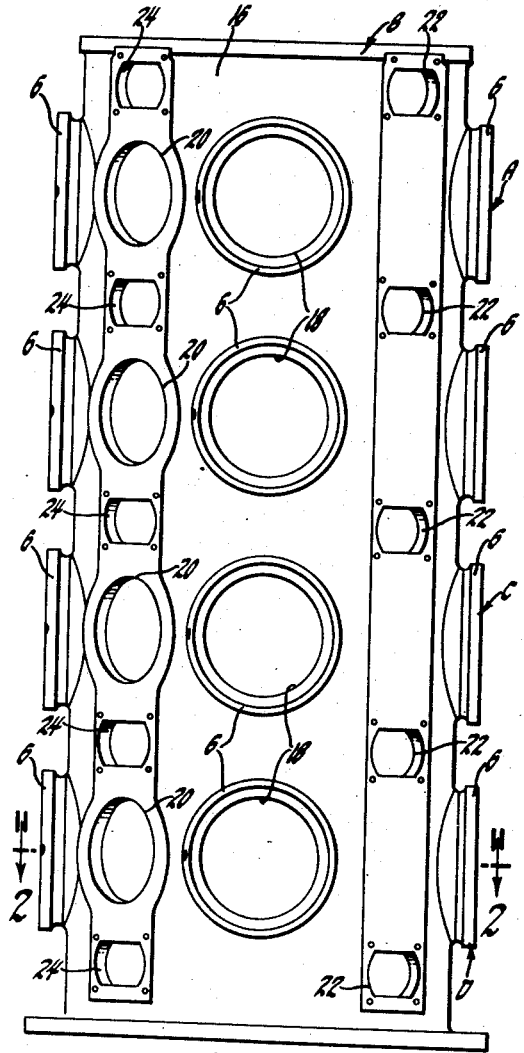
Figure 4 is an elevational view of the engine crankcase, taken in the direction of arrows 4—4 of Figure 2.

Referring now to the drawings, there is shown in Figure 1 a vertical crankshaft type, multi-row, sixteen cylinder radial engine 2, having four rows or banks designated A—D of four cylinders each. Each of the cylinders 4 are secured by suitable means at their inner ends to flanged mounting bosses 6 (Fig. 2) of a tunnel crankcase 8 which as shown in Figs. 4–6 is of one piece construction extending the full length of the engine proper. In Fig. 1 the numerals 10 and 12 indicate generally the intake and exhaust manifolding to and from the cylinders 4 which manifoldings are arranged externally of the crankcase 8. The crankcase rests on and is supported at its lower end by a frustroconical base 14 which may be made hollow and serves to enclose an electrical generator or other machine (not shown) driven by the engine.

As best shown in Figs. 4–6 the crankcase 8 has an outer generally cylindrical wall 16 provided with cylinder openings 18, hand-holes 20, oil drain manifold connecting ports 22 and core holes 24 (which, together with the hand holes 20 are subsequently covered by cap plates, not shown). For convenience during assembly and disassembly of the engine there is preferably provided two hand holes 20 for each cylinder row A—D on diametrically opposite sides of the crankcase.

The crankshaft 26 (Fig. 3) may be of one-piece construction extending the full length of the engine and in accordance with the present invention is preferably provided with a main journal 27 between each of the cylinder rows A—D as well as at the opposite ends of the crankcase. It will be understood that the respective throws of the crankshaft serve the cylinders of the rows A—D through means of the usual connecting rods and pistons (not shown) operating in the various cylinders 4. Any desired arrangement for connecting the pistons and their rods to the crankshaft may be employed, as the same forms no part of this invention. Where reference is made elsewhere either in the specification or claims to the term "crankthrow" it will be understood that the same denotes the usual rotating and reciprocating parts associated with the crankshaft and serving one or the other of the cylinder rows A—D.

Opposite each crankshaft main bearing the crankcase 8 has its outer wall 16 reinforced by an integrally formed internal web 28 of closed hollow section, preferably triangular in shape, as shown, whose upper and lower walls 30 and 32 converge toward an inwardly facing wall 34 which is cylindrical and concentric with the longitudinal axis of the crankshaft 26. The upper wall 30 of each of these hollow webs 28 is provided with one or more openings 36 through which lubricating oil draining downward from the respective crankthrows and from the engine accessory housing 38 (Fig. 1) may enter the interior of the web. Thus the webs 28 by reason of their hollow construction serve as oil drain collectors for each upwardly adjacent section of the engine.

Referring particularly to Figures 2 and 3, each main journal 27 is embraced by an annular bearing block 42 comprising two or more segmental shoes 44 having their opposing ends clamped in abutting interlocked engagement by suitable threaded fasteners such as bolts 46 arranged tangentially therein and secured with nuts 48 (Figs. 2 and 3). The bearing block 42, in turn, is embraced by an annular bearing carrier member 50 comprising a plurality (three as shown) of carrier segments 52 whose opposing ends are likewise held in abutting interlocked engagement with each other by bolts or other suitable fasteners 54. The bearing shoes 44 have their respective opposite upper and lower sides 56 and 58 presenting imperforate surfaces such that engine lubricating oil is prevented from passing therethrough in a direction longitudinally of the engine. The carrier segments 52 are also imperforate axially of the crankshaft to prevent passage of lubricating oil therethrough longitudinally of the engine, and it will thus be seen that each main bearing 42 and its associated carrier 50 and upwardly facing web wall 30 cooperate to partition the crankcase into separate crankthrow sections for the respective cylinder rows A—D.

Each main bearing carrier segment 52 has its web 60 drilled radially of the engine to slidably receive two dowels 62 and 64 which anchor the carrier and main bearing block against both rotation and axial movement relative to the crankcase. These dowels are retractible in the drilled openings 66 whereby they may be withdrawn from engagement with both the crankcase web and the bearing shoes to provide for insertion and removal of the individual carrier segments during engine assembly and disassembly. Each of these dowels is transversely drilled adjacent its end innermost of the carrier member to receive a dowel locking stud 68 which is threadedly retained in an opening 70 therefor in the web section 60 of the carrier when the dowel is in its projected position.

All of the dowels 62 and 64 are cylindrical in shape to fit the drilled openings 66 in the carrier segments, however the projectable ends 71 of the dowels 64 have their cylindrical surface relieved to obtain a flat sided section which is relatively thin in the direction longitudinal of the engine and relatively wide in the transverse direction. The dowels 62 do not have their projectable ends thus flattened and are instead cylindrically shaped in this portion. Only one cylindrically ended dowel 62 is used to locate each bearing block 42 to its associated carrier 50, and likewise only one cylindrically ended dowel 62 is used to locate each carrier to its associated crankcase web. The other dowels 64 which serve to additionally locate the carriers to the bearing blocks and webs have the flat sided end sections 71 previously described. Cylindrical recesses 72 are provided in the inwardly facing web wall of the crankcase and the outer periphery of the bearing shoes 44 to receive the dowels 62, and rectangular section recesses 74 are provided in the wall 34 and shoes 44 to receive the dowels 64. The rectangular section recesses 74 have their upper and lower walls 76 and 78 spaced apart to closely fit the flat sided ends 71 of the dowels 64, and the bottoms 80 of these recesses 74 are run out as shown in Fig. 2 to provide freedom of movement of these dowel ends rotatively about the crankshaft axis. In this manner accurate circumferential spacing of the dowel recesses 72 and 74 in the bearing block 50 and crankcase is obviated.

The bearing shoes 44 are provided on their inner peripheral faces with an annular groove 90 facing the crankshaft journal, through which groove lubricating oil is distributed circumferentially of the journal. One or both (as shown) of these shoes 44 is provided with a generally radial passage 91 which connects at its inner end with the groove 90 and with a like radial passage 94 extending through the web 60 of the bearing carrier 50. The outer end of the passage 94 in turn connects with the interior of the hollow crankcase web 28 through a passage 92 extending through the inwardly facing wall 34 of the web. The oil drain manifold connecting ports 22 in the crankcase outer wall 16 align with the passages 92 and connect the interiors of the webs with oil drain manifolds 100 extending longitudinally of the engine, these manifolds being bolted or otherwise removably secured to the crankcase outer wall 16. The outermost wall 102 of each drain manifold 100 has welded therein an oil feed manifold 104 which likewise extends longitudinally of the engine, and is provided opposite each of the ports 22 with a transverse sleeve 106 extending therethrough in a direction radially of the engine. Extending through this sleeve 106 is a bayonet type feed oil connector comprising a tube 108 terminating at its inner end in close fitting engagement within a counterbore 96 at the outer end of the passage 92 and closed at its outer end by a cover plate 110 which is bolted as at 112 to the flanged outer end of the sleeve 106. One or more side ports 114 are provided in the wall of the tube 108 through which feed oil from the delivery manifold 104 may enter the tube and be carried therefrom into the passage 92. It will be understood that the oil delivery and oil drain manifolds 104 and 100 are connected by suitable means to an oil circulating pump or the like (not shown).

Although only a single embodiment of the invention has been shown and described, various minor changes and alterations may of course be made without departing from the spirit and scope of the invention as defined by the following claims.

I claim:

1. In an internal combustion engine having a vertical crankshaft, a tunnel crankcase having an annular outer wall with reinforcing internal webs surrounding the crankshaft, said webs being of closed hollow section with imperforate bottom walls and having upper walls with openings providing communication between the interior of the crankcase and the interiors of the webs, means for introducing lubricating oil into the crankcase and means externally of said outer wall and connected with the interiors of said webs for returning oil from the engine.

2. In a vertical crankshaft internal combustion engine, a plurality of cylinders arranged in vertically spaced apart rows, a crankshaft, a tunnel crankcase having an outer wall provided with openings axially aligned with the respective cylinders, said outer wall having internal reinforcing webs extending annularly about the crankshaft at each end thereof and between at least one pair of adjacent cylinder rows, said crankshaft having journal portions opposite said webs, means for introducing lubricating oil to said journals, and means cooperating with said webs in both radially supporting said journal portions and partitioning the crankcase into separate substantially fluid-tight compartments, said last named means including segmental annular bearing shoes encircling the journal portions and segmental annular bearing carriers spacing said shoes from the webs, said webs being of closed hollow section and having openings accommodating drainage of lubricating oil into the webs from the respective crankcase compartments immediately thereabove.

3. In a crankcase for a multi-row, vertical crankshaft, radial, internal combustion engine, a generally cylindrical outer wall having a plurality of vertically spaced rows of circumferentially spaced openings therein adapted to be connected to the respective engine cylinders and radially inward extending annular webs of generally triangular shaped hollow section between each said row and its adjacent row of cylinder openings, said webs having walls imperforate to the portion of the crankcase containing the adjacent lower row of cylinder openings and having apertures in communication with the portion of the crankcase containing the row of cylinder openings upwardly adjacent thereto.

4. In a multi-throw vertical crankshaft engine, a tunnel crankcase having an outer peripheral wall with annular internal reinforcing webs of closed hollow section between each crankthrow, segmental annular members journalling the crankshaft between each crankthrow, said members being substantially imperforate longitudinally of the engine and cooperating with said webs to transversely partition the crankcase into distinct vertically associated compartments, means for delivering lubricating oil to the crankthrow of each compartment, said webs each having an opening in its wall connecting the interior of the web with the crankcase compartment immediately thereabove, and an oil drain manifold interconnecting the interiors of the respective webs.

5. In a vertical crankshaft internal combustion engine, a crankshaft, radial supporting means for the crankshaft comprising a tunnel crankcase with annular internal web portions surrounding the crankshaft having an internal diameter slightly greater than the maximum diameter swept by the crankshaft, segmental annular bearing blocks journalling the crankshaft opposite said webs, and segmental annular bearing carrier members concentrically spacing said blocks from said webs, said carrier members having radially projectible and retractible dowels for locating the carrier members to the bearing blocks and webs, said webs and bearing blocks having dowel receiving recesses, one of said recesses in each of said webs and bearing blocks being of similar sectional configuration transverse to the dowel received therein and the remaining dowel receiving recesses in both said webs and bearing blocks being elongated circumferentially of the crankshaft axis.

6. In a vertical crankshaft internal combustion engine, a crankshaft therefor, a tunnel crankcase having an outer wall and internal reinforcing webs, said webs extending annularly about the crankshaft and having an internal diameter sufficient to permit withdrawal and insertion of the crankshaft longitudinally of the crankcase, journalling means for the crankshaft opposite said webs including segmental annular bearing shoes and segmental annular bearing carriers radially spacing the shoes from the webs, said bearing shoes and said webs being provided on their carrier opposed surfaces with a plurality of circumferentially spaced dowel recesses, one of said recesses in each of said surfaces being cylindrical in shape and the remaining recesses in each of said surfaces being elongated circumferentially of the crankshaft, and cylindrical dowels releasably fixed to the carrier members having ends extending into said recesses.

7. In combination with a tunnel crankcase and a crankshaft insertible end-wise thereinto, means for radially supporting the crankshaft within the crankcase including an annular web integral with the crankcase and having an internal diameter greater than the throw diameter of the crankshaft and an annular member comprising separable annular segments having a slidable fit within said web, said member having a plurality of circumferentially spaced retractible dowels extending radially therefrom toward said web, said web having recesses receiving said dowels, one of said recesses being of similar size and shape as said dowels and the remainder of said recesses being elongated circumferentially of the crankshaft.

8. The invention of claim 7 wherein said dowels are cylindrical and said remainder of said recesses are of rectangular section transverse to the dowel axes, the shorter dimension of said section being less than the cylindrical diameter of the dowels, and the dowels receivable by said rectangular section recesses having flats relieving their cylindrical ends.

9. In combination with a crankshaft having a main journal of less diameter than the throw diameter of the shaft and a tunnel crankcase having an internal diameter greater than the throw diameter of said shaft, means removably secured to the crankcase for rotatably supporting said journal including a segmental annular bearing closely encircling the journal and an annular carrier member closely encircling the bearing, said carrier member having a plurality of circumferentially spaced retractible dowels extending therefrom toward said bearing, said bearing having recesses receiving said dowels, one of said recesses being of size and shape similar to the dowel received therein and the remainder of said recesses being elongated circumferentially of the crankshaft.

References Cited in the file of this patent

UNITED STATES PATENTS

| | | |
|---|---|---|
| 2,328,296 | Ritter | Aug. 31, 1943 |
| 2,371,797 | Brill | Mar. 20, 1945 |
| 2,439,187 | Roos | Apr. 6, 1948 |
| 2,448,369 | Heintz et al. | Aug. 31, 1948 |
| 2,539,132 | Harper | Jan. 23, 1951 |
| 2,625,145 | Brill | Jan. 13, 1953 |

FOREIGN PATENTS

| | | |
|---|---|---|
| 982,561 | France | June 12, 1951 |